US008885800B2

(12) United States Patent
Green

(10) Patent No.: US 8,885,800 B2
(45) Date of Patent: Nov. 11, 2014

(54) HOME GATEWAY TERMINAL SYSTEM

(71) Applicant: Arthur Green, Petersberg, VA (US)

(72) Inventor: Arthur Green, Petersberg, VA (US)

(*) Notice: Subject to any disclaimer, the term of this patent is extended or adjusted under 35 U.S.C. 154(b) by 0 days.

(21) Appl. No.: 13/789,243

(22) Filed: Mar. 7, 2013

(65) Prior Publication Data

US 2014/0254783 A1    Sep. 11, 2014

(51) Int. Cl.
*H04M 1/64* (2006.01)
*H04M 3/42* (2006.01)

(52) U.S. Cl.
CPC ........................................ *H04M 3/42* (2013.01)
USPC ... 379/88.17; 455/3.02; 455/427; 379/201.02

(58) Field of Classification Search
CPC .. H04M 2201/60; H04M 7/006; H04H 40/90;
H04H 20/74; H04H 20/51; H04N 7/20;
H04N 21/6143; H04B 7/18513; H04B
7/18523; H04B 7/18563
USPC ............... 379/88.17, 201.01, 201.02, 201.03,
379/201.05, 211.01; 455/3.02, 12.1, 98,
455/427
See application file for complete search history.

(56) References Cited

U.S. PATENT DOCUMENTS

| | | | |
|---|---|---|---|
| 5,898,780 A | 4/1999 | Liu et al. | |
| 6,226,304 B1 | 5/2001 | Ravishankar et al. | |
| 7,525,990 B2 | 4/2009 | Bossemeyer, Jr. et al. | |
| 7,596,129 B2 | 9/2009 | Bossemeyer, Jr. et al. | |
| 7,656,860 B2 | 2/2010 | Phillips et al. | |
| 8,350,889 B1* | 1/2013 | Shammoh | 348/14.02 |
| 2003/0114135 A1 | 6/2003 | Lorbeck | |
| 2006/0101116 A1 | 5/2006 | Rittman et al. | |
| 2007/0115942 A1 | 5/2007 | Money et al. | |

FOREIGN PATENT DOCUMENTS

| | | | | |
|---|---|---|---|---|
| EP | 0854591 A2 * | 7/1998 | ............. | H04B 7/185 |
| EP | 1318644 A1 * | 6/2003 | ............. | H04L 29/06 |

* cited by examiner

*Primary Examiner* — Antim Shah
(74) *Attorney, Agent, or Firm* — Raymond Sun

(57) ABSTRACT

A method of accessing a dedicated phone or Internet service at a remote location includes providing a system having a terminal, a phone, and a USB stick that is adapted to be used with a data-only communication device. The terminal has a phone jack that is coupled to a dedicated phone service line for use with the phone, a data jack that is coupled to a dedicated Internet service, and a connector that is adapted to receive a cable that is connected to a satellite dish for uplink and downlink communication with an orbiting satellite. Each of the phone and the USB stick are provided with an identification footprint that is unique to the terminal. The terminal is positioned at a first location. When the phone and/or the USB stick are moved to a remote location, voice and data signals corresponding to the dedicated phone service line and the dedicated Internet service can be communicated from the terminal to the phone and/or USB stick at the remote location via an antenna and the orbiting satellite.

2 Claims, 6 Drawing Sheets

HOME GATEWAY TERMINAL SYSTEM

BACKGROUND OF THE INVENTION

1. Field of the Invention

The present invention relates generally to communication systems, and in particular, to a gateway terminal system that allows a consumer to access the consumer's dedicated home phone and internet services from a remote location.

2. Description of the Prior Art

Typically, communication services that are purchased specifically for the home cannot be used outside the home when traveling. For example, if a consumer purchases the services for a home phone line from a carrier, the consumer does not have the ability to make a phone call using that specific phone line from outside the home. As a result, the consumer of such services would need to purchase additional phone services to use outside the home when he or she traveling. Once this additional service is purchased, it requires the consumer to have an additional phone number which in many cases is provided by a different phone company. Current technology has drastically reduced the cost of home phone lines, however the technology to have access to such services from the home has not kept pace with these services.

The same situation applies to home internet services. A consumer cannot access specific home internet services when traveling to a remote location without purchasing additional internet services or accessing free or other paid "wifi" hotspots, which may not always be readily available.

Thus, there remains a need to save on communication costs, as well as to consolidate such home phone and internet services so that a consumer can access these services from remote locations.

SUMMARY OF THE DISCLOSURE

One objective of the present invention is to provide a consumer with access to a specific phone line inside a home to make calls from remote locations using the same phone number.

Another objective of the present invention is to provide a consumer with access to a specific internet service inside a home from remote locations using the same internet service.

To accomplish the objectives set forth above, the present invention provides a method of accessing a dedicated phone or Internet service at a remote location. The present invention provides a system having a terminal, at least one phone, and at least one USB stick that is adapted to be used with a data-only communication device. The terminal has at least one phone jack that is coupled to a dedicated phone service line for use with the at least one phone, at least one data jack that is coupled to a dedicated Internet service, and a connector that is adapted to receive a cable that is connected to a satellite dish for uplink and downlink communication with an orbiting satellite. Each of the at least one phone and the USB stick are provided with an identification footprint that is unique to the terminal. The terminal is positioned at a first location. When one of the at least one phones and the USB stick are moved to a remote location, voice and data signals corresponding to the dedicated phone service line and the dedicated Internet service can be communicated from the terminal to the one of the at least one phones and the USB stick at the remote location via an antenna and the orbiting satellite.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a gateway terminal system that allows a consumer to have access to a specific home phone line or home Internet service from a remote location so that the user can use the same phone number, or the same Internet connection, from a distant remote location. For example, the system can be used primarily outside a user's home when traveling to a remote location. When traveling, the user will have the ability to access home communication services from anywhere in the world.

Figure 1:
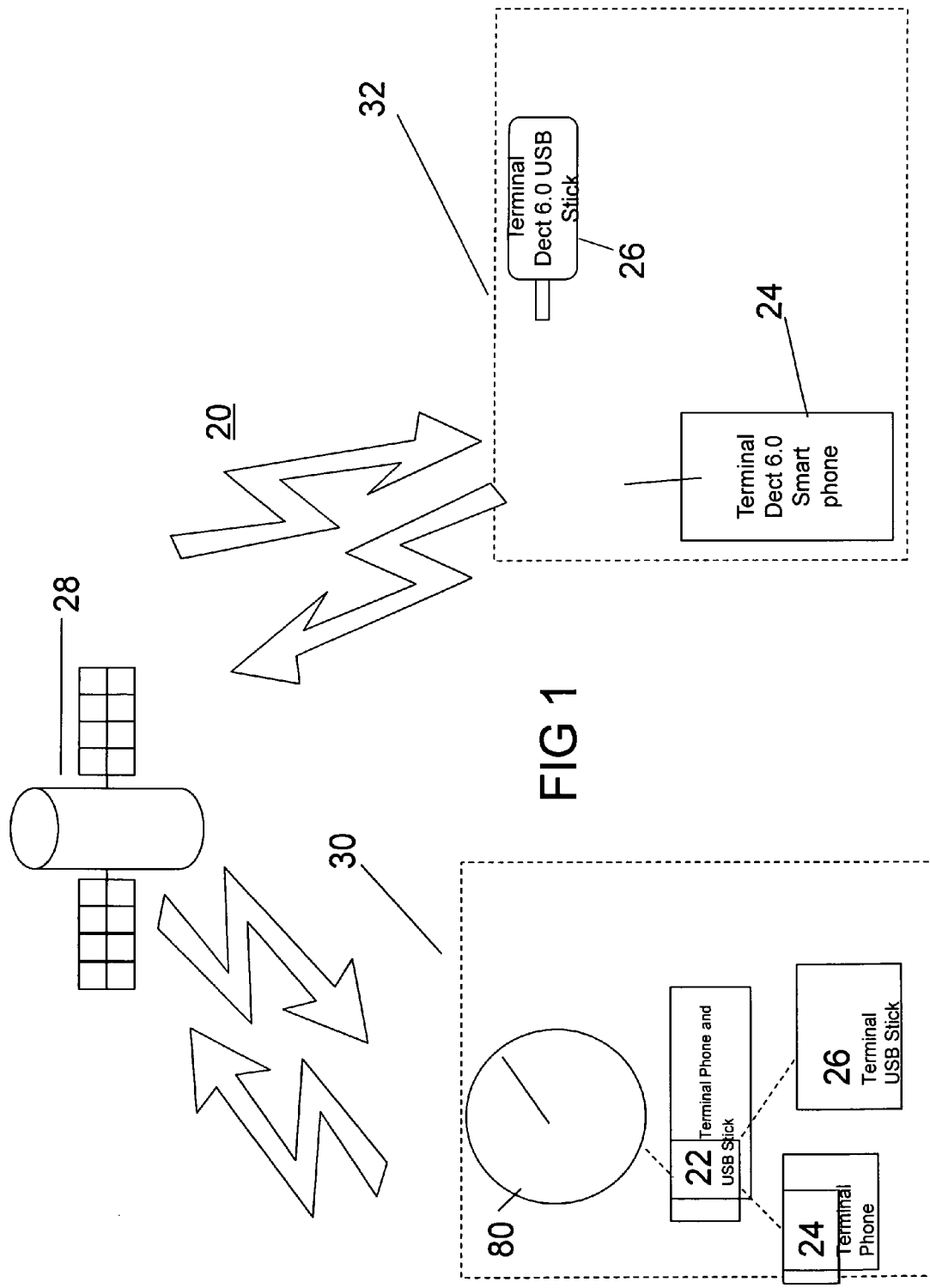
FIG. 1 is a system drawing illustrating the basic components of a gateway terminal system according to one embodiment of the present invention.

FIG. 1 illustrates the components of the gateway terminal system 20 of the present invention, which includes a home gateway terminal 22, one or more Dect 6.0 smart phones 24 that are adapted for use in the home 30, and one or more Dect 6.0 USB sticks 26 that are adapted for use in the home 30. The terminal 22, the phone(s) 24 and the stick(s) are initially located inside a home or office or other similar "permanent" location 30. The terminal 22 communicates via any satellite 28 with other Dect 6.0 smart phones 24 and other Dect 6.0 USB sticks 26 that are located at a remote location 32. The remote location 32 can be another home, office or building (e.g., airport, hotel, etc.). In addition, the phones 24 and sticks 26 at the remote location 32 can be the same phone(s) 24 and stick(s) 26 that were in use at the home 30, but then taken by the user to the remote location 32.

Figure 2:
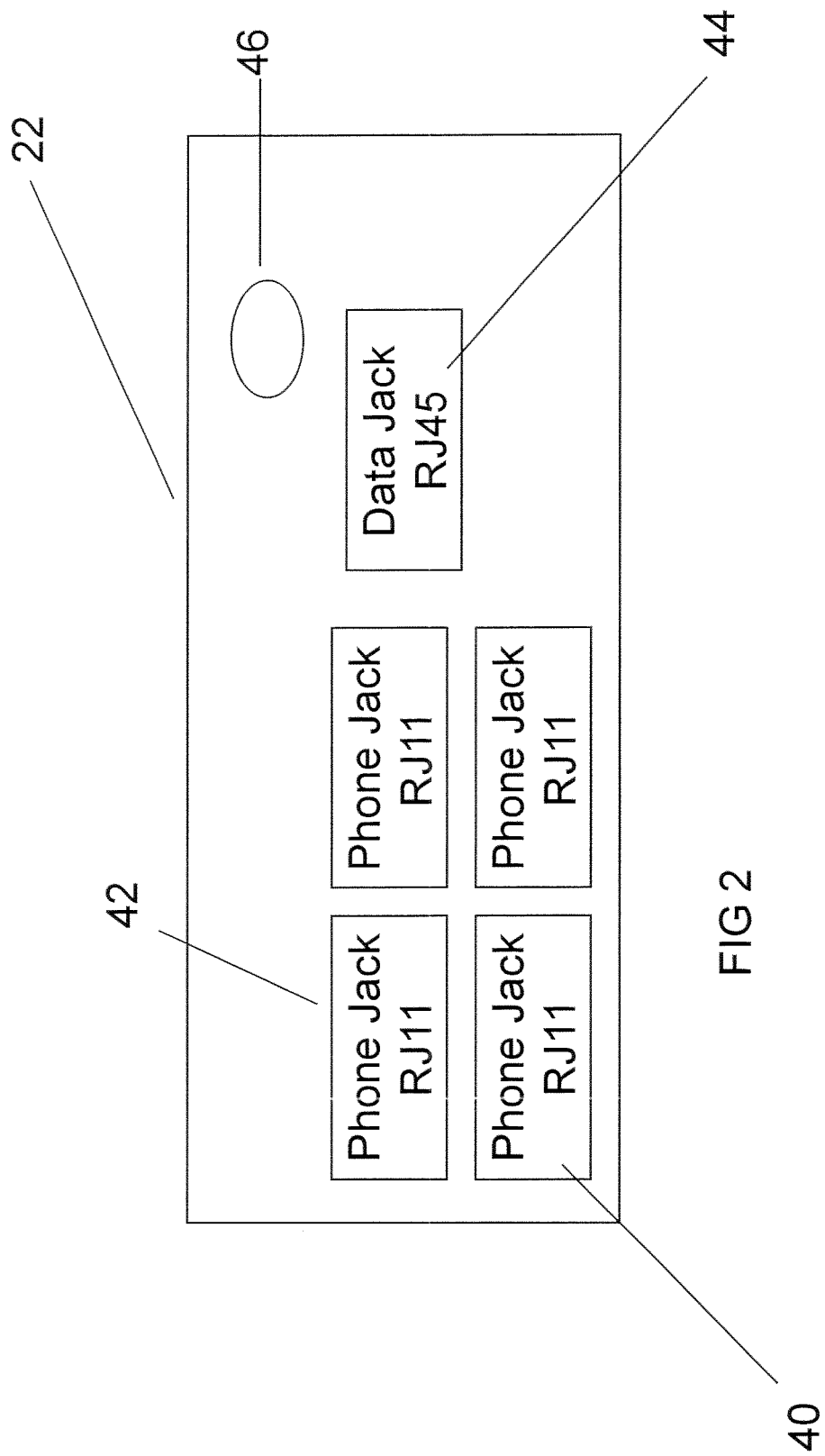
FIG. 2 is a front view of a home terminal box for the system of FIG. 1.
Figure 3:
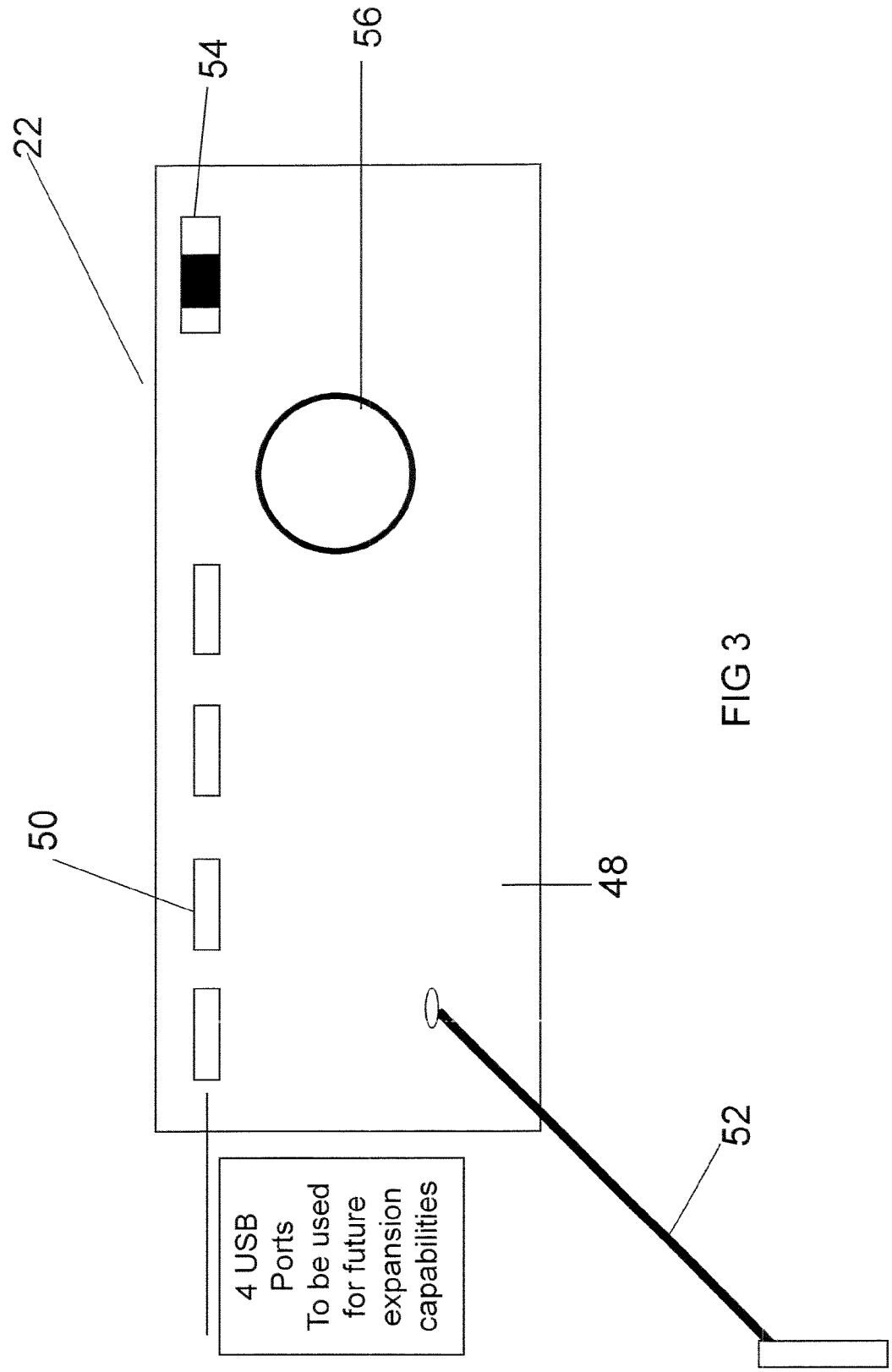
FIG. 3 is a rear view of the home terminal box of FIG. 2.

The terminal 22 is illustrated in greater detail in FIGS. 2 and 3. The terminal 22 remains stationary in the home 30, and can handle up to a plurality (e.g., 4) of phone lines and at least one high speed Internet connection. The terminal 22 is also capable of communicating with up to the same number of phones 24 and up to ten personal data-only devices via the Dect 6.0 USB stick 26. In FIG. 2, the front panel 42 of the terminal 22 has four phone jacks 40, each supporting a separate phone line that is assignable to a corresponding phone 24. A data jack 44 is also provided on the front panel 42 for supporting an Internet line. An LED light 46 denotes whether the power is on or off. In FIG. 3, the rear 48 of the terminal 22 includes a plurality of USB ports 50 that can be used for future expansion, such as internet protocol security cameras for viewing inside/outside the home, signal communicators for turning off/on appliances, or lights using the dedicated smartphone or any data-only device that can communicate with the terminal 22 with through a USB stick 26. The rear 48 of the terminal 22 also includes a power cord 52 for delivering power, a power on/off switch 54, and an F-type connector 56 that is adapted to receive an RG6 cable that is connected to a conventional satellite dish outside the home 30 for uplink and downlink communication with an orbiting satellite 28 in outer space. All merged signals are sent and received via this connection for communication within the system 20.

Figure 4:
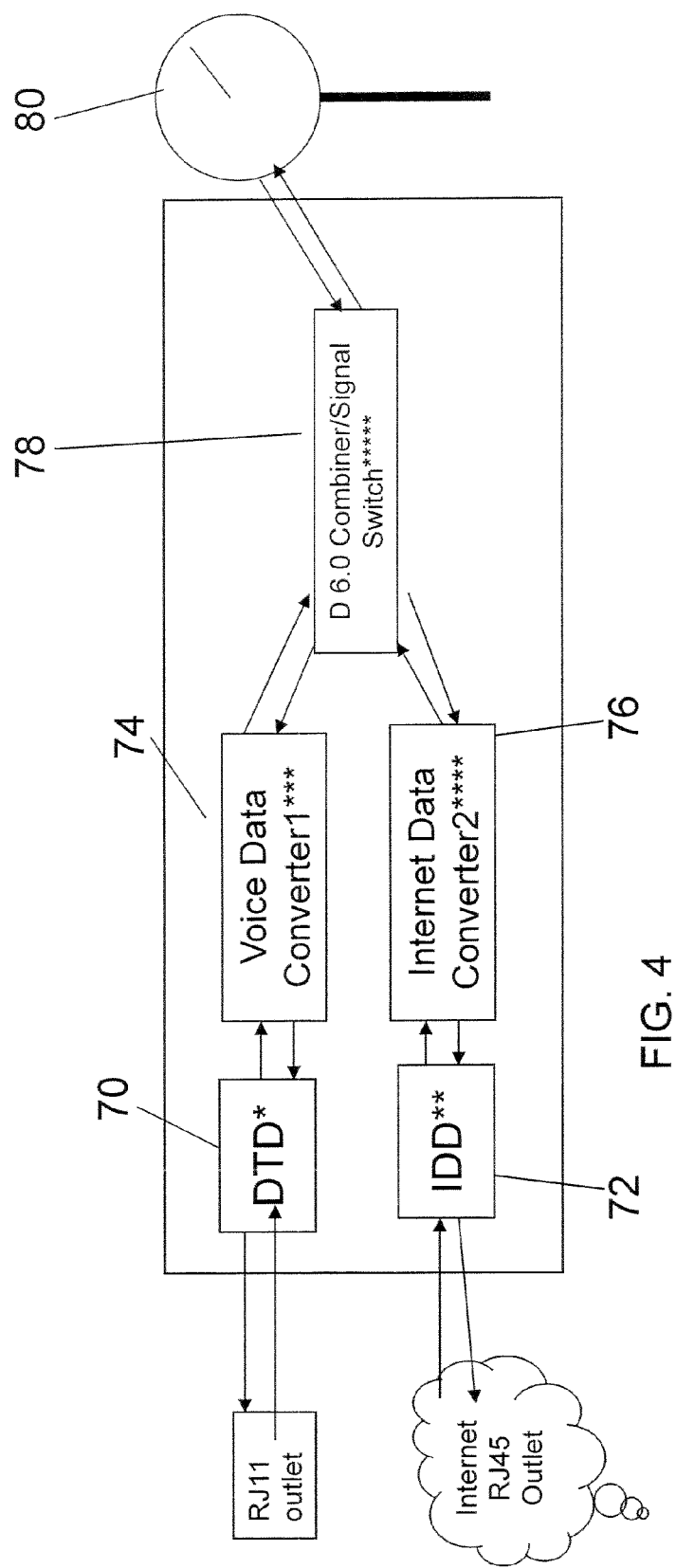
FIG. 4 is a schematic drawing of the internal circuitry for the home terminal box of FIG. 2.
Figure 5:
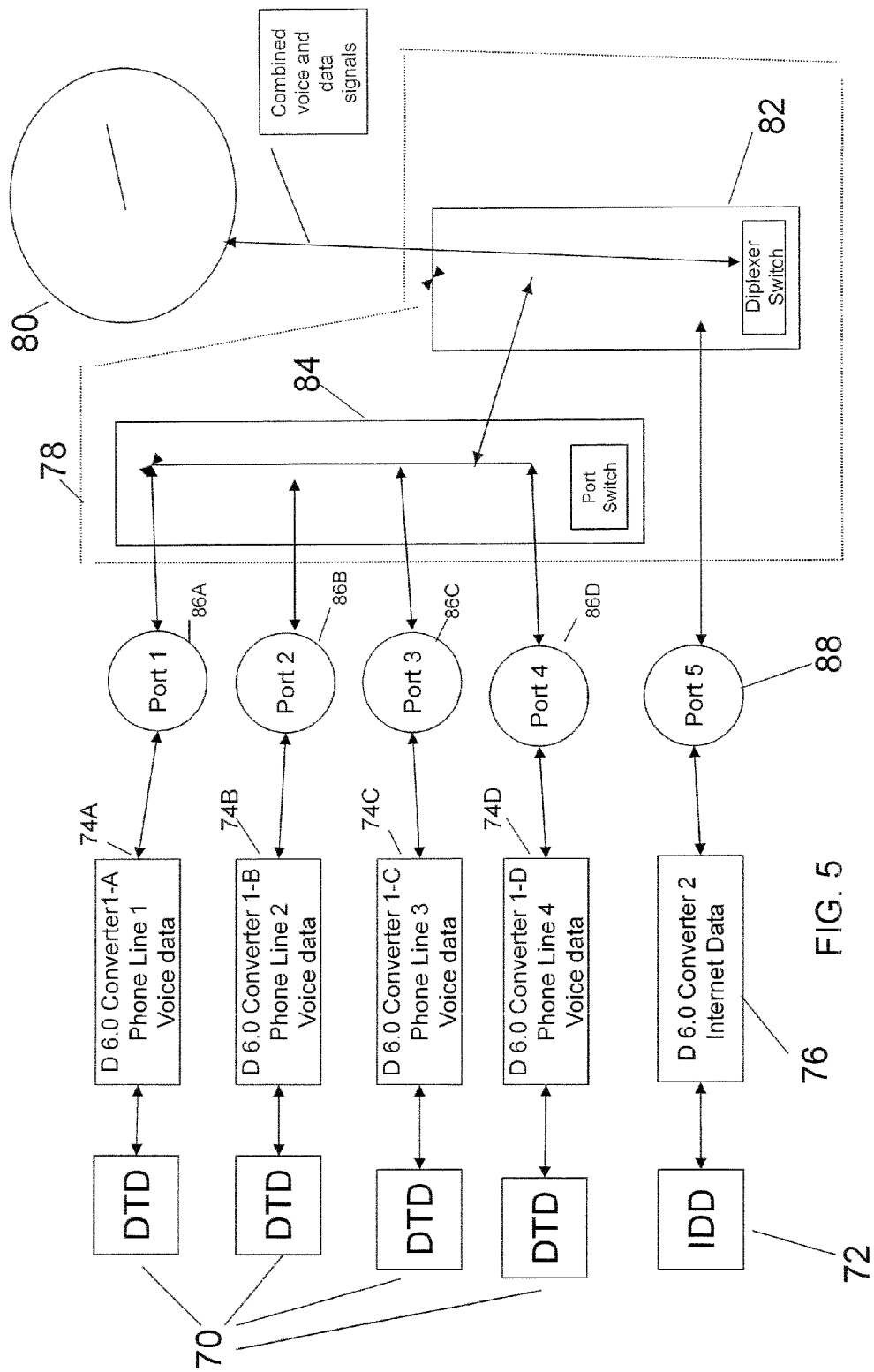
FIG. 5 is an expanded schematic drawing of the circuitry in FIG. 4

Referring now to FIGS. 4 and 5, the terminal 22 further includes a plurality of dial-tone detectors (DTD) 70, an Internet data detector (IDD) 72, a plurality of voice data converters 74A-74D, and an Internet data converter 76. Each DTD 70 detects voice data from a corresponding phone jack 42, and each voice data converter 74A-74D is coupled to a corresponding DTD 70 to convert voice data into Dect 6.0 frequency to communicate with the processor in the corresponding phone 24. Similarly, the IDD 72 detects Internet data from the modem via the data jack 44, and the Internet data converter 76 is coupled to the IDD 72 to convert Internet data into Dect 6.0 frequency derivative to communicate with the Internet data processor that is inside the smart phone 24 or the USB stick 26. The terminal 22 further includes a combiner/signal switch 78 which combines the signals received from the converters 74A-74D and 76, and then transmits the signals to an antenna 80. The combiner/signal switch 78 includes a port switch 84 which receives all the signals from the various voice data converters 74A-74D via corresponding ports 86A-86D, respectively, and a diplexer switch 82 which receives the selected signal from the port switch 84 and the Internet data converter 76 (via a port 88). The signal that is delivered from the diplexer switch 82 to the antenna 80 can include up to the number of phones 24 and be distributed to the correct phone 24 at a remote location based on the phone number.

These components in the terminal 22 can work in reverse as well to process a signal received from the antenna 80. The combiner/signal switch 78 receives voice and data signals from the antenna 80 and routes the signal to the correct converter 74A-74D or 76, which then converts the received signal and sends the signal to the corresponding DTD 70 or IDD 72, which then communicates the data to either the appropriate phone line or the modem.

Figure 6:
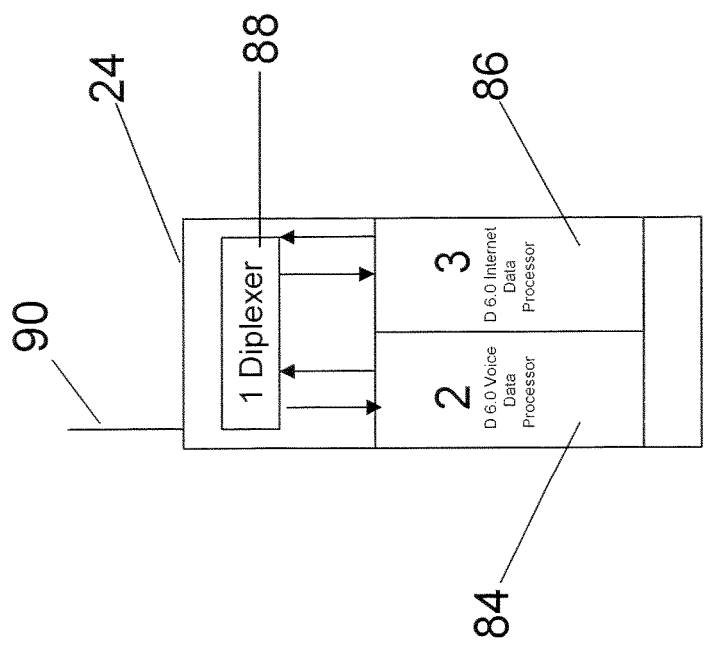
FIG. 6 is a schematic diagram of a Dect 6.0 smart phone that can be used with the system of FIG. 1.

Referring to FIG. 6, each Dect 6.0 smart phone 24 can be any conventional smart phone or mobile phone that is commonly available in the market, and has embedded firmware/software that allows the phone 24 to communicate with the terminal 22 via a satellite connection, much like any conventional mobile device that is used outside the home with voice and Internet capabilities. The phone 24 has a voice data processor 84 and an Internet data processor 86 that are coupled to a diplexer 88. Signals to and from the phone 24 are transmitted via an antenna 90. The diplexer 88 separates voice and data signals to route signals to and from the proper processor 84 or 86 to communicate with the terminal 22. The voice data processor 84 receives and transmits all voice communications, and the Internet data processor 86 receives and transmits all Internet data communications.

The smart phone 24 can also include other features. For example, the smart phone 24 can include a built-in camera on the front and/or the rear, and speakerphone capabilities. The smart phone 24 is typically battery-powered with a conventional charger. The smart phone 24 can also include a 16 MB memory that is built-in, or expandable via a micro SD slot. The smart phone 24 can also have a 5-inch 1080 pixel viewing screen, a virtual keypad, and TTY/TTD support. In addition, since the smart phone 24 is intended to be used outside the home 30, it should have a weatherproof and durable design.

Each Dect 6.0 USB stick 26 can be plugged into the USB port of any data-only communication device that is not included with the system 22. This stick 26 is intended for use with data-only equipment, such as laptops, tablets, mobile phones and similar devices. The stick 26 typically includes an internet data processor similar to the processor 86 in the phone 24. The stick 26 can also include a built-in antenna/modem, a removable memory micro SD slot, and can also provide for TTY/TTD support.

The system 20 further includes software that is adapted to be installed on personal-data-only communication devices of any brand (e.g., laptops, tablets, etc.) purchased by the consumer to allow these devices to communicate with the terminal 22 when using the provided Dect 6.0 USB stick 26 in combination with a PIN# activation. The software can be installed by download from the Internet, or from a disk.

In one embodiment, the system 20 operates in the following manner. First, a consumer or user purchases dedicated phone line(s) and/or high speed internet services from any provider company. Next, the user purchases a system 20, and then connects the system components together in the manner shown in FIG. 1 for use in a first location 30 (e.g., home or office). The user then connects the phone and Internet services to the terminal 22. The user can use a phone 24 at the first location 30 like he/she would use a regular phone, and would access the Internet using the USB stick 26 with a data-only communication device (e.g., laptop, tablet) at the first location 30 like he/she would use a regular laptop or tablet for wireless access at the first location 30.

Once all these services are connected, the terminal 22 is activated by a Satellite service company (i.e., the company which makes and sells the system 20), which can be done via the company's website. The terminal 22 will combine these services and convert to a satellite signal that will be projected via an antenna 80 outside the first location to a satellite 28 in outer space. This satellite 28 in outer space will bounce these combined services back to earth within the Dect 6.0 frequency range to communicate with the phone(s) 24 and/or other data-only-devices (i.e., with a stick 26 installed) programmed to receive the signal from that particular terminal 22 due to a specific pin number activation code. Therefore, any of the phone(s) 24 or USB sticks 26 can be removed from the first location 30 and taken to a remote second location 32 for use there. All devices that are programmed to receive the communication signals from that specific terminal 22 will have the ability to reverse this process to send communication signals back to the terminal 22 via the satellite 28 to access home phone and Internet services from remote locations 32.

To facilitate these communications, the terminal 22 produces a "Skyfi" signal that will be beamed to a satellite 28 to produce a "footprint" signal that can be broadcast anywhere in the world. All devices with the access code of the terminal 22 under this footprint signal can communicate with and access the specific home phone and Internet services associated with the particular terminal 22 from remote locations 32. The "footprint" is the total broadcast/receiving area of the orbiting satellite 28 that transmits signals between the terminal 22 and the smartphone 24 or data-only-device. In particular, each terminal 22 will have an identification signal with two separate pin numbers: one Voice PIN and one Data PIN. The Voice PIN will allow any of the phones 24 that are programmed with that PIN to communicate with the phone lines of the terminal 22 when at home (first location 30) or at a remote location (second location 32). All Voice PIN/Data PIN programming is done using the phone 24 that is needed to communicate with the terminal 22. Only phones 24 that are programmed with that terminal's specific Voice PIN number can access that terminal's communication signals broadcasted from the satellite 28. When multiple phone lines on a terminal 22 are used, the phones 24 coded with that terminal's specific Voice PIN can be programmed to access any specific or all of the phone lines active on the terminal 22. The uplinked signal to the satellite 28 broadcast or transmit the electrical communicative energy of the terminal 22 to communicate with the phone 24 when at home (first location 30) or at a remote location (second location 32). The Data PIN will allow any phones 24 or sticks 26 programmed with that terminal's specific Data PIN to access the terminal's data only signals. Any phone 24 that is programmed with a specific terminal's Voice PIN and Data PIN can receive or transmit both voice and data signals broadcast to and from the satellite 28. In addition, the stick 26 can only receive data signals and can only be programmed with the Data PIN of a specific terminal 22. All Data PIN programming for stick(s) 26 is performed when the stick 26 is inserted into the USB port of any computer or any data-only device with loaded communication software/firmware that will allow that data-only device to communicate with the terminal 22 via satellite 28. The stick 26 must remain with the USB port of the data-only device to communicate with the terminal 22 once the Data PIN is activated.

The system 20 is a challenge to the established mobile communications business that currently gives the consumer the ability to have consolidated services of phone and Internet at home and when traveling, but at a much higher cost than if originated and accessed from the home. For example, a family of three each using the Sprint "Everything Data Plan" for personal use would each require a separate individual plan at a total minimum cost of $240.00/month. However, with the system 20 of the present invention, each individual could use and have access to their home Internet service at a total cost of about $60.00/month, and/or home phone service which could be a low as $1.70/month per person. This means that the total cost would be around $66.00/month for all three, with truly unlimited services and no contracts or early termination fees.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of accessing a dedicated phone or Internet service at a remote location using a system comprising a terminal, at least one phone, and at least one Universal Serial Bus (USB) stick that is adapted to be used with a data-only communication device, the terminal having at least one phone jack that is coupled to a dedicated phone service line for use with the at least one phone, at least one data jack that is coupled to a dedicated Internet service, and a connector that is adapted to receive a cable that is connected to a satellite dish for uplink and downlink communication with an orbiting satellite, wherein each of the at least one phone is provided with an identification footprint that is unique to the terminal, the method comprising:

positioning the terminal at a first location;
 removing one of the at least one phones and the USB stick to a remote location; and
 communicating voice and data signals corresponding to the dedicated phone service line and the dedicated Internet service from the terminal to the one of the at least one phones and the USB stick at the remote location via an antenna and the orbiting satellite, with communication being enabled by verification of the identification footprint;
 wherein the at least one phone can only communicate voice signals through the dedicated phone service line, and the at least one USB stick can only communicate data signals through the dedicated Internet service;
 providing the terminal with at least one dial-tone detector (DTD) for detecting voice data from the corresponding at least one phone jack, with at least one voice data converter coupled to a corresponding DTD to convert voice data to communicate with the corresponding phone; and
 providing the terminal with an Internet data detector (IDD) for detecting Internet data from a modem via the at least one data jack, with an Internet data converter coupled to the IDD to convert Internet data.

2. The method of claim 1, further including:
 communicating voice and data signals corresponding to the dedicated phone service line and the dedicated Internet service from the one of the at least one phones and the USB stick at the remote location to the terminal at the first location via an antenna and the orbiting satellite, with communication being enabled by verification of the identification footprint.

* * * * *